March 12, 1940.  G. SLAYTER ET AL  2,192,939
AGRICULTURAL APPLICATION OF GLASS WOOL
Filed May 17, 1937
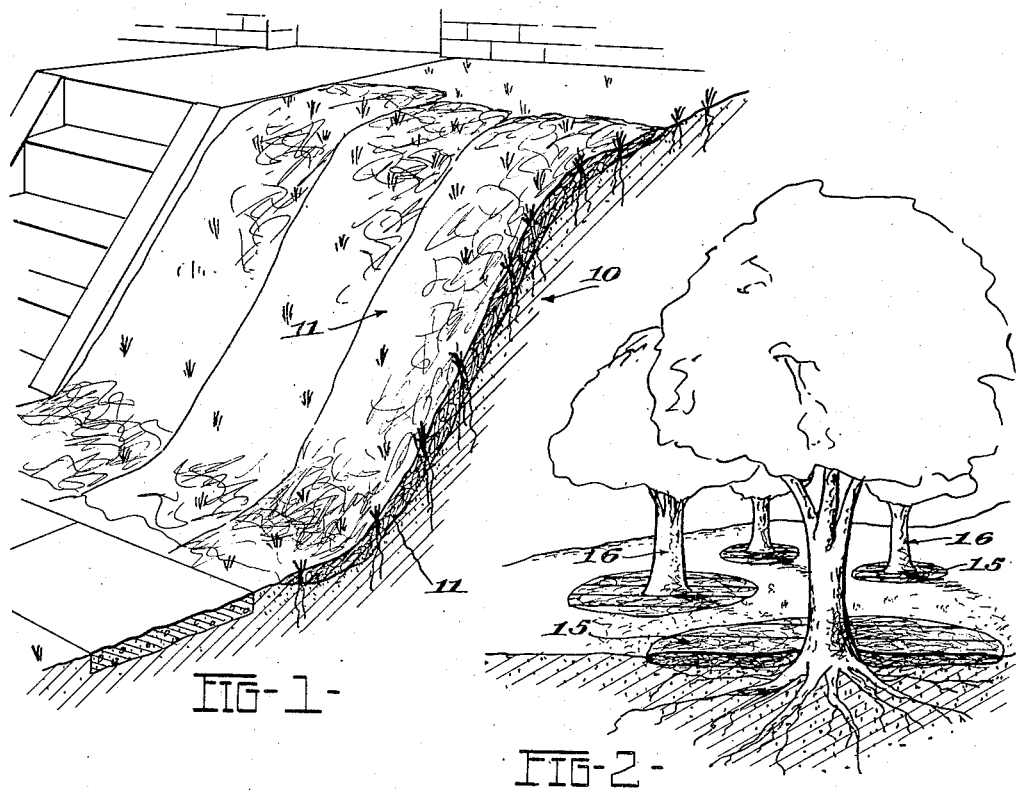
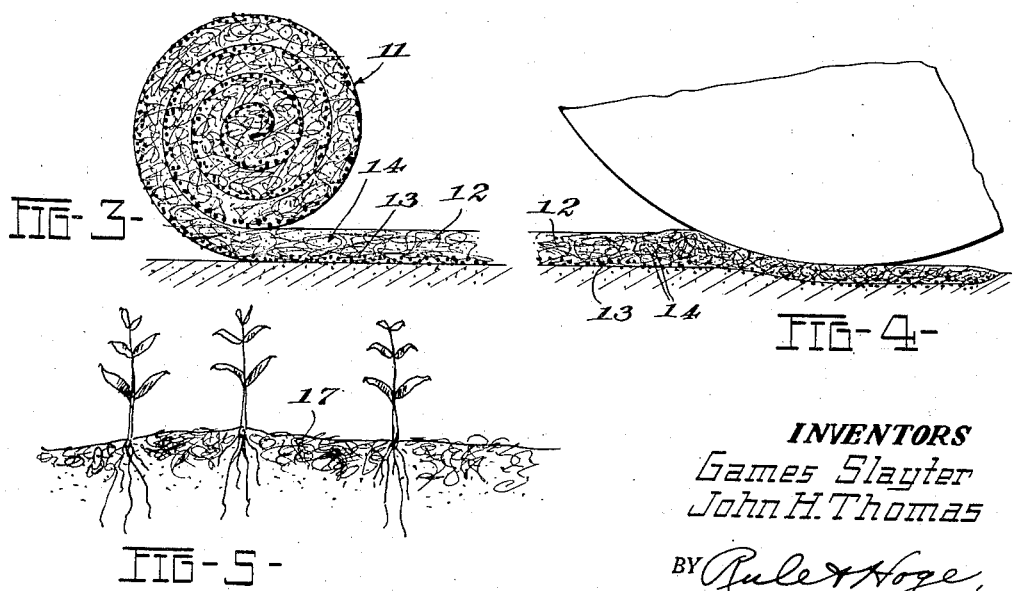
INVENTORS
James Slayter
John H. Thomas
BY *Rule & Hoge*,
ATTORNEYS.

Patented Mar. 12, 1940

2,192,939

UNITED STATES PATENT OFFICE 2,192,939

AGRICULTURAL APPLICATION OF GLASS WOOL

Games Slayter and John H. Thomas, Newark, Ohio, assignors, by mesne assignments, to Owens-Corning Fiberglas Corporation, a corporation of Delaware Application May 17, 1937, Serial No. 143,008

8 Claims. (Cl. 47—1)

The present invention relates in part to the use of fibrous glass as a covering or protective component in the soil, particularly at a time when the ground is bare and without plant growth; and also relates in part to certain novel compositions of ingredients of the glass adapted to serve as a fertilizer or conditioner of the soil.

The present invention also relates in part to a fabricated body of fibrous glass having fertilizers, seeds, or other desirable materials or substances distributed thereover or combined therewith.

One of the objects of the invention is to provide a method and means to prevent dusting, or soil erosion, or displacement of the soil for other reasons especially when situated on a bank or hill, due to wind, rain, or sun, or other atmospheric conditions to which the soil or ground may be subjected.

Another object of the invention is to provide a protective covering for the soil which will retard thawing of the ground in the spring, so that plants protected thereby will remain dormant until danger from late frosts is past. Thus means is provided to prevent premature blooming of various plants, such as apple trees, other fruit trees, flowers, or the like, in spring at the first warm spell, which might expose the trees or plants to freezing upon a sudden return to cold weather. In this connection, a further object of the invention is to maintain a more uniform temperature in the ground, and to draw the frost therefrom slowly and uniformly.

Another object of the invention is the provision of a fibrous mat having distributed throughout or on one surface thereof, an even application of seed, and, if desired, an application of fertilizer or soil conditioner of any suitable type which is to be used in the ground. An article having these characteristics may be applied over freshly ploughed and harrowed soil, and may then be rolled or otherwise tamped more firmly into the ground to distribute the seed and fertilizer thereto and simultaneously prevent soil erosion by the rapid runoff of surface waters.

Another object of the invention is the provision of means to be applied to the soil adapted to prevent birds, the wind, or sun from carrying away or destroying the seed which may have been sown into or on the ground; and to this end we propose placing a mat of inorganic mineral fibrous material over the surface of the ground, and, if desired, embed it under the surface of the ground a short distance. A mat having these characteristics also tends to prevent the withdrawal of moisture from the ground by preventing the wind and sun from coming in contact with it.

The invention also relates to a new composition of matter for supplying the mineral elements which are necessary to plant growth in the soil. It has as a purpose to make available to plants the vital constituents for healthful growth and rapid maturity. In other words, its purpose is to bring about a soil condiiton most favorable to plant life and its development, and to maintain a constant supply in the soil of those elements which make for the best plant life. In carrying out this invention, we may compound a glass or mineral batch containing suitable proportions of calcium, magnesium, phosphate, sulphide, iron, potassium, sodium, barium, manganese, copper, and/or zinc or other desired ingredients. The composition of the batch may be varied to correspond with the condition of the soil as to acidity or alkalinity, which can be determined by chemical analysis as one skilled in the art would understand. Usually the soil is deficient in lime and phosphorous and these two elements are the ones most rapidly removed, and accordingly the glass batch may consist to a large extent of these two ingredients.

The proportions may also be properly balanced in order that the glass may be gradually soluble in rain water, or can be slowly decomposed by the action of weathering. The following glass compositions are indicative of the types of glasses which may be used for this purpose and which are soluble to a degree by weathering by weight, $P_2O_5$, 25% to 50%; $SiO_2$, 0 to 30%; $K_2O$, 15% to 30%; CaO, 20% to 30%

In addition to these ingredients, there may be included small amounts of other metallic oxides such as soda, magnesia, sulphate, and other substances beneficial to soil. In making up these glass batches, it may be possible to use the naturally occurring minerals such as phosphate rock, limestone, saltpeter, etc. Ordinary lime bottle glass, such as an emerald green glass or the like, may be used in fabricating the glass wool. The destruction and disintegration of this glass under weathering proceeds at a moderate rate, particularly if there is a constant temperature cycle to which the glass is subjected.

The glass batch may be melted and compounded by any of the usual processes in the glass making art, and it may be blown into glass wool by any suitable method, as, for example, by the method disclosed in the English patent applied for by Triggs, No. 428,720. The wool is preferably fabricated into a thin mat form so that it may be spread over the area to be fertilized with the least possible amount of labor.

Other objects and advantages of the present invention will become apparent from the following description taken in conjunction with the drawing, in which:

Fig. 1 is a perspective view of a fabricated body of fibrous glass wool, applied to the surface of soil which is located on a hill or bank;

Fig. 2 is a perspective view of a number of trees having an application of glass wool covering the root areas thereof;

Fig. 3 is an elevational view, partly in section, of a rolled mat of glass wool having distributed therethrough a fertilizer, and, if desired, seeds;

Fig. 4 is an elevational view, shown partly in section, of a mat illustrated in Fig. 3, which has been laid over the ground and is now being rolled into the earth; and Fig. 5 is an elevational view shown partly in section of the surface of the earth having an application of glass wool embedded therein, and illustrating flowers or plants growing up from the ground through the glass wool.

Referring more particularly to Fig. 1, reference character 10 designates a bank or hilly place in the ground which it is desired to cultivate and cover with a full, rich lawn. While the ground is still bare, it is seriously subjected to soil erosion by the rapid runoff of surface water and by the wind and other elements. In order to hold the soil particles more firmly in place and conserve more completely the soluble elements in the soil, I have provided a thin mat 11 of glass wool fibers overlying, and preferably at least partially embedded within, the soil.

Prior to the application, the soil may be prepared for seeding in the usual manner, that is, it may be loosened, as by being spaded and raked, or where possible, it may be ploughed and harrowed so that the surface is relatively soft and in a suitable condition to receive the fertilizer and the seeds and the layer of glass wool which may be laid over it. The layer of glass wool is preferably relatively thin, as, for example, about ¼ inch to 1 inch thick. After the layer of glass wool is laid on the soil, it may be rolled or stamped into place, and, if desired, an additional thin layer of soil may be applied as a covering over the glass wool layer to hold it more firmly in place.

As another feature of the invention, more particularly illustrated in Figs. 3 and 4, we may coat the glass wool fibers 12 with a suitable adhesive and then distribute over the adhesive an application of seed, such as grass seed 13 or the like. Such a distribution may be made more accurately and economically than the distribution usually made in the field by merely throwing the seeds over the ground.

The binder or adhesive which is used may also contribute desirable plant food to the soil. These could be the non-metallic elements such as the nitrates and the sulphates, or other suitable compounds which cannot be directly incorporated as an ingredient in the glass composition.

Various fertilizers 14 may also be distributed throughout the mat and adhesively bonded thereto if desired. For example, cereal grain, fodder, urea compounds, or other conditioners or fertilizers, may be incorporated into the fabricated fibrous glass mat.

A mat of glass wool of the previously described characteristics may be very useful in the practice of horticulture. As illustrated in Fig. 2, a mat 15 may be placed over the root area of fruit trees 16 to impart to them its mineral properties. In addition, the glass wool mats will protect the trees from premature blossoming in the spring. That is, the heat insulating properties of the wool will keep the ground frozen a longer period of time, and will prevent the heat from penetrating the root areas too quickly. As a result, the sap within the trees will not arise from the roots until the danger of frost and consequent damage to the buds will be passed. A further advantage of this material as pointed out hereinabove, is that it will tend to reduce and prevent erosion of the soil by the rapid runoff of surface waters. The mat will hold the soil particles in place and this in turn will conserve the soluble elements in the soil.

Fig. 5 illustrates a cross-section of top soil having a fibrous body 17 of glass wool impounded therein. This may be done in any suitable manner as, for example, laying down a thin web or mat of glass wool and then covering the soil with a thin layer of loose dirt, or the glass wool may be directly cultivated into the earth. It is also possible to deposit the mat on the surface of the ground in the fall of the year and allow the winter snows to weather the minerals from the glass into the soil. In any event, a supply of mineral elements may thus be made available in the soil over a long period of time. It has been found that the presence of the glass wool in or on the top soil of the ground, does not prevent plant growth, and, as a matter of fact, in many instances it facilitates and assists in the rapid development of plant life.

Modifications may be resorted to within the scope of the present invention as defined in the appended claims.

We claim:

1. The method of preparing the soil for growing plants therein, which comprises loosening said soil, sowing seeds therein, and then laying an intermatted and integrated blanket of glass wool fibers over the surface thereof and at least partially embedded therein.

2. The method of preparing the soil for growing plants therein, which comprises applying a fabricated body of ceramic mineral fibers to the surface of said soil, said fibers being composed of substances selected for their fertilizing and soil conditioning value and combined in proportions to supply desired proportions of different fertilizing agents to the soil, said fibers being capable of gradually disintegrating and at least partially dissolving into the moisture present in the soil under the action of the elements and thereby imparting their ingredients as a fertilizer for the soil.

3. In combination, a fabricated body of glass wool fibers, a fertilizer distributed throughout said body, and means for holding in place within said body seeds distributed throughout said body.

4. In combination, a fabricated body of mineral fibers, adhesive applied over at least part of said fibers, said adhesive being composed, at least in part, of soluble ingredients capable of fertilizing the ground, said adhesive also serving as a means for holding seeds distributed through said body and causing them to adhere.

5. Means for preparing and preserving the soil, which comprises an intermatted body of glass wool fibers spread over the surface of the soil and at least partially embedded in the soil, said glass fibers consisting of a glass capable of rapid disintegration and solution caused by weathering conditions.

6. A product of manufacture comprising a matted body of fine glass fibers, and a bonding material bonding the fibers together and serving as a mens for securing in place seeds distributed throughout said body.

7. A product of manufacture comprising a matted body of fine glass fibers, and a bonding material bonding the fibers together and serving as a means for securing in place seeds distributed throughout said body, said bonding material comprising ingredients which serve as plant food and are gradually released to the soil when said body is applied as a surface covering for the soil.

8. Means providing a soil cover comprising a blanket of matted glass fibers having a composition permitting the fibers to be dissolved by the elements to which they are subjected while in use as a soil cover, said composition comprising in percentage by weight, 25% to 50% of $P_2O_5$; 0 to 30% of $SiO_2$; 15 to 30% of $K_2O$; and 20 to 30% of $CaO$.

GAMES SLAYTER.
JOHN H. THOMAS.